United States Patent [19]

Erickson

[11] Patent Number: 5,572,885
[45] Date of Patent: Nov. 12, 1996

[54] SHROUDED COILED CRESTED TUBE DIABATIC MASS EXCHANGER

[76] Inventor: Donald C. Erickson, 1704 S. Harbor La., Annapolis, Md. 21401

[21] Appl. No.: 465,828

[22] Filed: Jun. 6, 1995

[51] Int. Cl.$^6$ .............................. F25B 15/12; F25B 37/00
[52] U.S. Cl. .............................. 62/484; 62/494; 165/163; 165/DIG. 406
[58] Field of Search .............................. 62/476, 484–485, 62/494; 165/163–172, 910, DIG. 163, DIG. 164, DIG. 165–DIG. 172, DIG. 173, DIG. 174, DIG. 175, DIG. 355, DIG. 406–DIG. 441, DIG. 453, DIG. 522, DIG. 535

[56] References Cited

U.S. PATENT DOCUMENTS

| | | | |
|---|---|---|---|
| 1,785,159 | 12/1931 | Ullman | 165/163 |
| 3,828,575 | 8/1974 | Mallosky et al. | 62/476 |
| 4,065,264 | 12/1977 | Lewin | 23/258.5 BH |
| 4,926,659 | 5/1990 | Christensen et al. | 62/476 |
| 5,067,330 | 11/1991 | Cook et al. | 62/485 |
| 5,325,684 | 7/1994 | Stierlin et al. | 62/487 |

*Primary Examiner*—William Doerrler

[57] ABSTRACT

A non-adiabatic vapor-liquid contact device is disclosed which achieves high heat transfer effectiveness without sacrificing mass transfer effectiveness. Referring to FIG. 2, a helical coil of crested tubing 84 is contained within the annualr space between shrouds 82 and 83. Liquid flows downward through the annulus, and vapor flows countercurrently upward. The mass exchanging fluids pass through the space between tube crests and the shroud, achieving very effective mixing. Heat transfer fluid is flowed through the tubing via connections 87 and 88.

20 Claims, 4 Drawing Sheets

5,572,885

SHROUDED COILED CRESTED TUBE DIABATIC MASS EXCHANGER

TECHNICAL FIELD

A vapor liquid contact apparatus is disclosed which effectively exchanges heat with the fluids undergoing mass transfer, i.e. accomplishes diabatic mass transfer. Diabatic mass transfer is an important component of many processes, ranging from fractional distillion and absorption to desorption and evaporation, and is especially important in GAX absorption cycles.

BACKGROUND ART

Conceptually adiabatic mass exchanger is simply the combination of a heat exchanger plus a mass exchanger. However effective mass exchange has very exacting requirements, relating to liquid distribution, mixing of bulk flows, and achievement of vapor-liquid contact surface. Most straightforward combinations of known heat exchangers with known mass exchangers cause a marked degradation in the expected mass exchange.

Nonetheless, there is a substantial benefit to identifying and implementing those few combinations which do yield effective diabatic mass exchange, for the processes using them can achieve major efficiency gains and size reductions.

Diabatic fractionators have been referred to as "reflux heat exchangers", "reflux condensers", or as "dephlegmators." Prior art embodiments have generally been the plate fin type, as disclosed in U.S. Pat. Nos. 3,508,412; 3,625,017; and 5,316,628. Note also U.S. Pat. No. 5,410,885.

One special case of diabatic mass exchange is found in absorption heat pumps. Prior art examples of diabatic mass exchangers in absorption heat pumps are found in U.S. Pat. Nos. 4,127,009; 4,688,399; 5,282,507; 5,367,884; and 5,339,654.

Two cases can be distinguished, according to whether the less volatile component (the sorbent) is non-volatile, in which case the vapor is single component, or the sorbent is volatile, i.e. the vapor is multicomponent. Countercurrent mass exchange becomes very important in most vapor-liquid contact operations with volatile sorbents, and especially so in GAX absorption cycles.

Whereas most prior art disclosed embodiments of diabatic mass exchangers have been the plate fin type, some have been shell and tube (U.S. Pat. No. 5,255,528), and some have been helically coiled tubing.

The various prior art embodiments generally have one or more shortcomings: insufficient liquid distribution; insufficient bulk mixing of liquid and/or of vapor; excessive fluid inventory; costly and difficult construction practices; excessive pressure drop; and/or not suitable for countercurrent vapor-liquid contact. What is needed, and among the objects of this invention, are process and apparatus for diabatic mass exchange which efficiently establishes and maintains good liquid distribution and wetting; which achieves good vapor-liquid mass transfer and low pressure drop coupled with effective heat exchange; reduced fluid inventory; and which is easily manufacturable from readily available components

DISCLOSURE OF INVENTION

It has now been discovered that diabatic mass exchange can be beneficially conducted using a coiled crested tubular configuration in combination with shrouds.

The shrouded, coiled tubing is crested, for example by fluting, tinning, indentations, corrugations, or the like. In that way the shrouds can be tightly pressed against both the external and internal surface of the coil, and the valleys between crests allow for fluid passage. With helical cresting (also called spiral cresting), as opposed to radial cresting, the tubing has been found to provide excellent liquid distribution characteristics: most drip points on the top of each tube will result in two or more drip points from the bottom of the tube. The adherent shrouds function to keep the liquid confined to the same coil/channel, so it cannot escape to and concentrate at some other coil. At the same time the shrouds provide additional vapor-liquid contact surface, and owing to the points of thermal contact with the tubing, also additional heat transfer surface. Heat transfer medium is flowed through the coiled tubing, and the desired vapor-liquid contact and mass exchange takes place outside the tubing, in the annular space formed by the shrouds.

The shrouded coiled crested tube diabatic mass exchange configuration has been found to be especially effective in countercurrent flow vapor-liquid contact. The apparatus is mounted with the coil axis vertical, and with liquid flowing down from the top of the coil and vapor flowing up from the bottom. The total fluid flow area, determined by the coil diameter and the crest geometry, is sized large enough that flooding does not occur, i.e. that countercurrent vapor-liquid flow occurs through each valley between crests. The geometry of the crests and valleys can be varied over the height of the mass exchanger to accommodate differing fluid volumetric flowrates.

Several different countercurrent vapor-liquid contact examples or situations can be distinguished for which this diabatic mass exchanger provides benefits. The most general is where liquid is distributed to the top of the coil, vapor is distributed to the bottom, and a different vapor is removed from the top, and a correspondingly different liquid is removed from the bottom. When the temperature gradient gets hotter from the top of the coil to the bottom, this represents fractional distillation (more volatile substance at top). When heat is supplied from the tubing to the mass exchange process, it is the stripping portion of distillation, and when heat is removed, it is the rectification portion of distillation.

When no vapor is withdrawn from the top, and when the liquid supplied at the top is the lower volatility feed, such that the temperature gradient gets colder from top to bottom, then the process is termed absorption. If vapor is withdrawn from the top, with the reversed temperature gradient (hot at top), it is called reverse distillation.

For both the "cold at top" and "hot at top" configurations, other applications are possible for any of the following variants: no liquid supplied to the top; no vapor supplied to the bottom; and no liquid withdrawn from the bottom.

Whereas the description thus far has for clarity described only a single coil, there will frequently be multiple concentric helical coils in a pressure vessel, with the outer shroud of one coil forming the inner shroud of the next larger coil. Also, each coil can when appropriate be formed from more than one parallel strands of tubing. All tubes may be supplied the same heat transfer fluid; but also when appropriate different tubes can be supplied with different heat transfer fluids—whether different coils or different strands of the same coil.

In some instances it will be beneficial to have the coils have smaller diameters at one end than the other, i.e. have a truncated conical shape vice right circular cylinder. This accommodates changing fluid duties (lower duty at smaller end) and also facilitates assembly—each completed shroud can be readily slipped over its coil. Another beneficial means of accommodating different duties at different heights is to vary the crest and valley geometry of the tubing at different heights—with deeper valleys allowing greater fluid duties.

Most prior art diabatic mass exchangers exchange sensible heat only to or from the heat transfer medium. However the embodiment disclosed herein explicitly extends to a latent-to-latent exchange. In the case of a cooling diabatic mass exchanger, the heat is preferably transferred to a cocurrent desorbing sorbent mixture in the tubing, and in the case of a heating diabatic mass exchanger, the heat is transferred from a cocurrent absorbing sorbent mixture in the tubing or from a condensing vapor. The former example has particular application to GAX absorption cycles.

In yet another embodiment, this invention provides a combination of heat and mass exchange component for an absorption cycle apparatus comprised of:

a) at least one helical coil of crested tubing:

b) a cylindrical inner shroud in thermal contact with the inner surface of said coil;

c) a cylindrical outer shroud in thermal contact with the outer surface of said coil;

d) a containment which supports said coil such that the coil axis is approximately vertical;

e) means for supplying a downflowing liquid and an upflowing vapor to the annular space between said shrouds; and f) a means for transporting heat transfer fluid through said tubing.

BEST MODE FOR CARRYING OUT THE INVENTION

Figure 1:
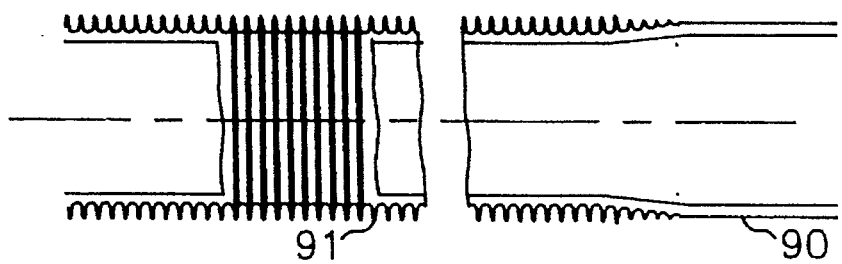
FIGS. 1a–1d illustrate example types of crested tubing.
Figure 1:
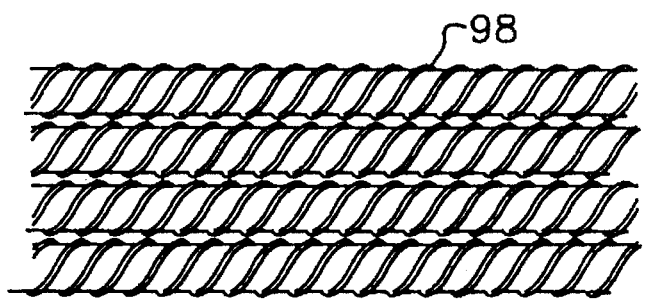
Figure 1:
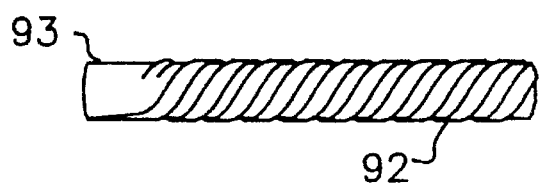
Figure 1:
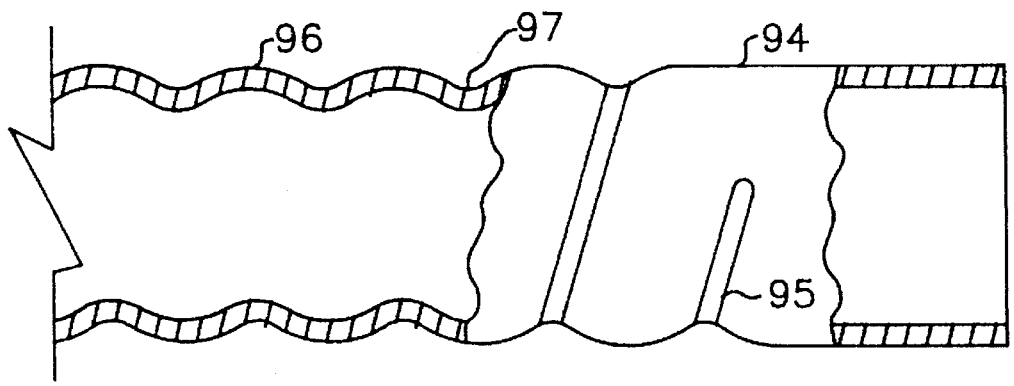

FIGS. 1a–1d illustrate three commonly encountered types of crested tubing. Tube 90 in FIG. 1a has fins 91 helically machined onto its outer surface. The same effect can be obtained by spirally wrapping separate fin material around the tube. Tube 93 in FIG. 1c has been mechanically twisted to cause multiple flutes 92 to appear. Tube bank 98 in FIG. 1b consists of multiple parallel pieces of that fluted tubing. Tube 94 in FIG. 1d has been spirally mechanically indented (indentation 95), thereby forming crests 96 and valleys 97. When the same indentation is applied radially vice spirally, it is sometimes referred to as corrugated tubing.

Figure 2:
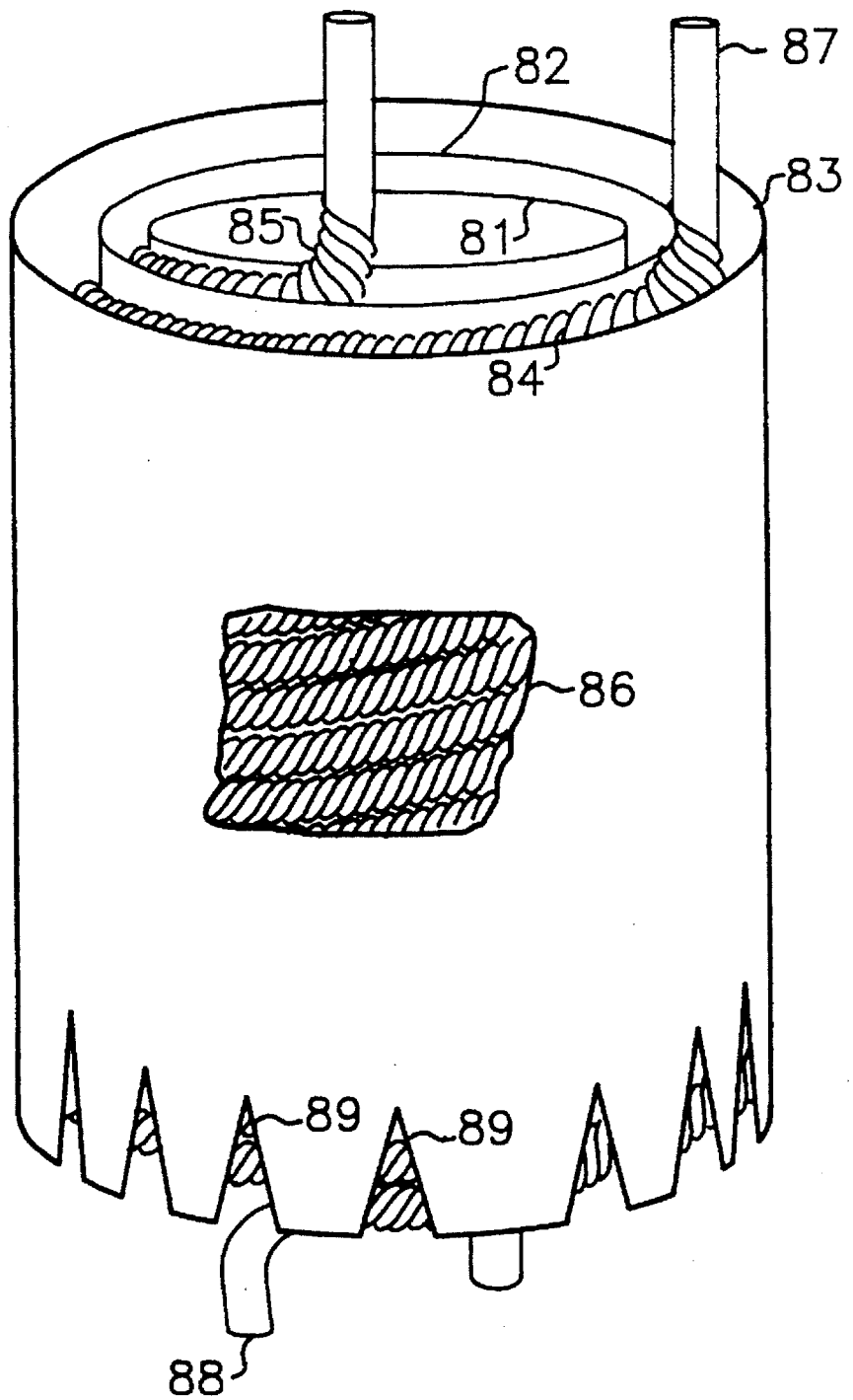
FIG. 2 illustrates a shrouded crested coiled tube configuration.

FIG. 2 illustrates three cylindrical shrouds 81, 82, and 83 plus two coils of crested tubing 84 and 85 which are annularly enclosed by the shrouds. Shroud 82 is both the outer shroud for tubing coil 85 and the inner shroud for tubing coil 84.

Cutaway 86 illustrates several rows of coil 84. Ports 87 and 88 supply heat transfer fluid to and from the inside (tube side) of coil 84. The shrouds are preferably sheet metal, rolled or bent into the conforming shape (cylindrical or truncated cone, as the case may be). The shrouds are preferably in thermal contact with their associated tube coils. The shrouded helically coiled crested tube configuration of FIG. 2 is illustrated with two concentric coils, but any other number of coils is possible, including one. Cutouts 89 may be provided at one end of the shrouds to accommodate higher vapor-liquid volumetric flowrates without reaching flooding or entrainment limitations.

Figure 3:
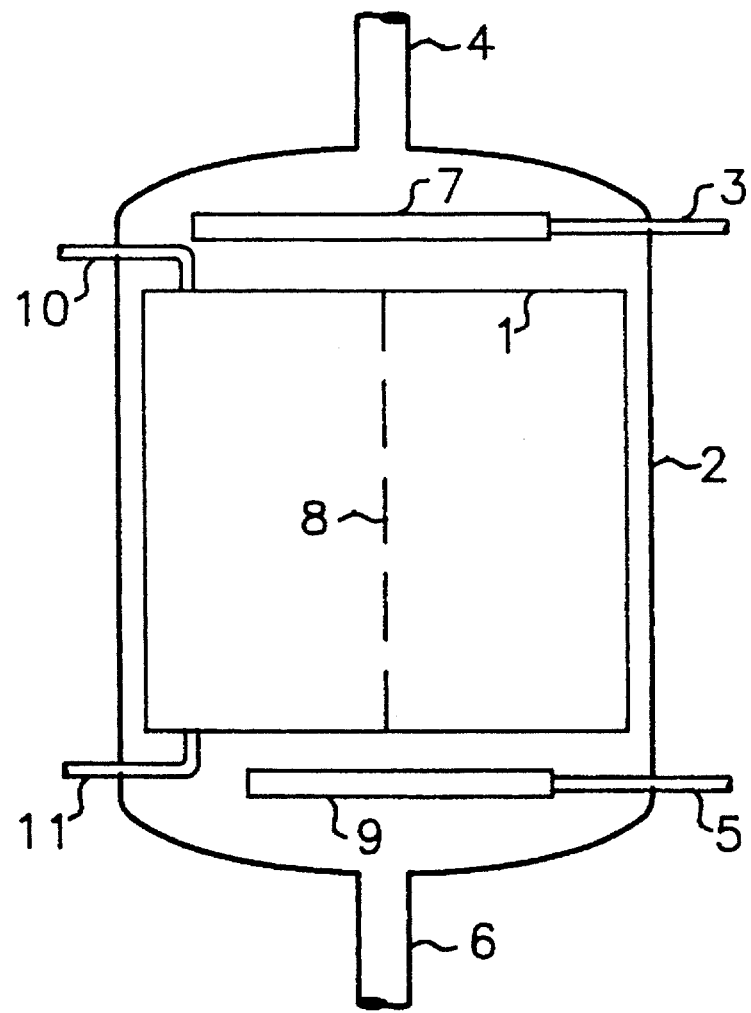
FIG. 3 illustrates different modes of application for the helically coiled crested tube mass exchanger with shrouds.

FIG. 3 illustrates different modes of application of the coiled tube configurations combined with shrouds described above. The coiled tube configuration 1 is positioned within containment 2 (e.g. a pressure vessel) such that the tube coil axis 8 is approximately vertical. For countercurrent vapor-liquid mass transfer, liquid is supplied to the top of the outside of the coil via pod 3 and liquid distributor 7. Vapor is supplied to the bottom of the outside of the coil via pod 5 and distributor 9. Heat transfer fluid is supplied to and from the inside of the tube via pods 10 and 11. Product fluid is withdrawn from overhead pod 4, and product liquid is withdrawn from bottom port 6. As explained earlier, dependent upon the particular application, the fluid duty through any one of pods 3, 4, 5, and 6 may be set to zero. Also the heat transfer fluid may flow either direction between pods 10 and 11, and also may either supply heat or remove heat.

Figure 4:
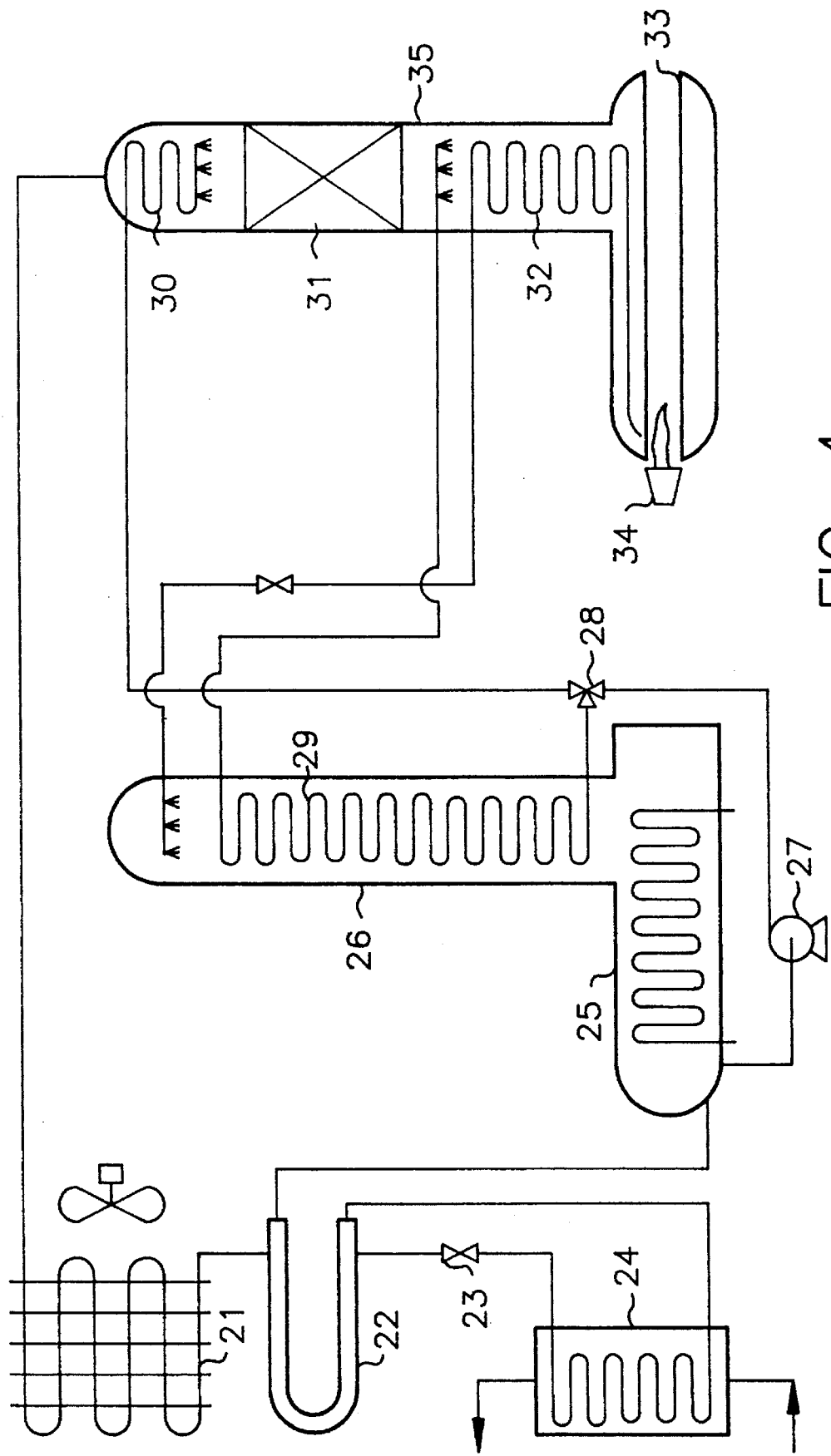
FIG. 4 is a simplified schematic flowsheet of a GAX absorption cycle illustrating locations where the disclosed invention can beneficially be applied.

FIG. 4 is a schematic flowsheet of a basic generator-absorber heat exchange (GAX) absorption cycle apparatus, adapted for operation with aqueous ammonia working fluid. Liquid ammonia condensate from condenser 21 is routed through refrigerant heat exchanger 22, refrigerant pressure letdown 23, and into evaporator 24. Evaporated low pressure refrigerant is routed back through RHX (refrigerant heat exchanger) 22 to externally cooled absorber 25 and thence to GAX absorber 26. Weak absorbent solution (i.e. having high $NH_3$ content) is withdrawn from the cold end of absorber 25 and pressurized by solution pump 27. It is split by splitter 28, with pad routed to GAX desorption coil 29 and another part routed to solution cooled rectifier coil 30. The latter stream after heating is distributed onto adiabatic vapor-liquid contact media 31, then joined with the effluent from coil 29 and distributed over the diabatic mass transfer section 32 (also known as the generator heat exchanger). Finally the remaining mass exchanged liquid reaches the horizontal fire tube generator 33, which is heated by burner 34. Vapor traversing upward through distillation column 35 steadily increases in flow rate and in ammonia concentration until it reaches more than 99% purity, when it is withdrawn and routed to condenser 21, completing the cycle.

The disclosed helically coiled crested tubing with shrouds can be beneficially applied as the GAX component (29 and 26), the solution cooled rectifier 30, and the generator heat exchanger 32. All three of those components require shell-side non-adiabatic countercurrent vapor-liquid mass exchange, which is very advantageously supplied as disclosed herein.

One additional important advantage of the shrouds is that, due to thermal contact with more than one coil, they can compensate for fluid maldistribution which may be present, helping to balance the thermal load.

I claim:

1. A combination heat and mass exchange component for an absorption cycle apparatus comprised of:

a) at least one helical coil of crested tubing:

b) a cylindrical inner shroud in thermal contact with the inner surface, of said coil;

c) a cylindrical outer shroud in thermal contact with the outer surface of said coil;

d) a containment which supports said coil such that the coil axis is approximately vertical;

e) means for supplying a downflowing liquid and an upflowing vapor to the annular space between said shrouds; and f) a means for transporting heat transfer fluid through said tubing.

2. The component according to claim 1 additionally comprising a liquid distributor at the top of said coil and a liquid withdrawal port from said containment below said coil.

3. The component according to claim 2 comprising multiple concentric helical coils of crested tubing.

4. The component according to claim 3 wherein aqueous ammonia is the working fluid of said absorption cycle, and wherein hot nearly pure water is supplied to said liquid distributor, and low pressure ammonia vapor of greater than 90% purity is supplied to the bottom of said coil.

5. The component according to claim 4 wherein said absorption cycle apparatus is comprised of a solution pump, and additionally comprising a solution flowpath from said pump discharge to the bottom tubing inlet for flow through said tubing.

6. The component according to claim 5 wherein said crested tubing is fluted tubing.

7. The component according to claim 1 comprised of multiple concentric helical coils of crested tubing.

8. The component according to claim 7 wherein said absorption cycle apparatus is comprised of a solution pump, a condenser, and aqueous ammonia working fluid.

9. The component according to claim 8 additionally comprising a solution flowpath from said pump discharge to the top inlet of at least one of said tubes, for flow therethrough, plus a vapor withdrawal port from the top of said containment for connection to said condenser.

10. The component according to claim 8 additionally comprising a supply of ambient cooled heat transfer fluid to at least one of said tubes, plus a vapor withdrawal port from the top of said containment for transport to said condenser.

11. A non-adiabatic mass transfer apparatus for countercurrent vapor-liquid contact comprising:

a) a shrouded coil of crested tubing;

b) a countercurrent flow of liquid and vapor between the shroud and the tubing, through the valleys between the tubing crests; and c) a flow of heat transfer fluid through said tubing.

12. The apparatus according to claim 11 comprising at least one of the stripping section and the rectifying section of a distillation column.

13. The apparatus according to claim 12 comprising the rectifying section of an absorption cycle apparatus.

14. The apparatus according to claim 11 comprising the vapor-liquid contact portion of an absorption column.

15. The apparatus according to claim 14 comprising the generator-absorber heat exchange (GAX) component of a GAX absorption cycle.

16. A process for diabatic countercurrent vapor-liquid contact comprising:

a) providing a coil of crested tubing contained between two shrouds b) distributing liquid to the top of the outside of said coil;

c) supplying vapor to the bottom of the outside of said coil; and d) flowing heat transfer fluid through said tubing.

17. The process according to claim 16 additionally comprising providing thermal contact between said tubing and at least one of said shrouds.

18. The process according to claim 16 additionally comprising at least one of providing an additional coil inside the inner shroud; providing two parallel strands of tubing in at least one of said coils; and providing a boiling multicomponent mixture as said heat transfer fluid.

19. The apparatus according to claim 11 additionally comprising a second coil of crested tubing, concentric with said first coil and in thermal contact with the opposite side of the shroud of the first coil.

20. The apparatus according to claim 11 additionally comprising a multicomponent two-phase fluid as said heat transfer fluid.

* * * * *